(12) United States Patent
Russ

(10) Patent No.: US 8,352,167 B2
(45) Date of Patent: Jan. 8, 2013

(54) METHOD FOR CONTROLLING AN ENGINE

(75) Inventor: Stephen George Russ, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/365,953

(22) Filed: Feb. 3, 2012

(65) Prior Publication Data

US 2012/0265422 A1 Oct. 18, 2012

Related U.S. Application Data

(63) Continuation of application No. 13/044,807, filed on Mar. 10, 2011, now Pat. No. 8,112,218.

(51) Int. Cl.
*G06F 19/00* (2006.01)
*F02P 5/15* (2006.01)
*F01N 3/10* (2006.01)
*F02D 23/02* (2006.01)
*F02D 41/14* (2006.01)
*F02B 33/44* (2006.01)

(52) U.S. Cl. .......... 701/114; 123/406.45; 123/443; 123/676; 60/277; 60/285; 60/601; 60/605.1; 701/103; 701/109

(58) Field of Classification Search .......... 123/295, 123/305, 406.45, 406.47, 406.48, 443, 478, 123/480, 672, 674, 676, 679, 494; 701/101–105, 701/109–115; 60/274, 276, 277, 285, 299–301, 60/600, 601, 605.1
See application file for complete search history.

(56) References Cited

U.S. PATENT DOCUMENTS

| | | | |
|---|---|---|---|
| 4,492,203 A | 1/1985 | Yutaka | |
| 4,493,303 A | 1/1985 | Thompson et al. | |
| 5,158,063 A | 10/1992 | Hosoda et al. | |
| 6,708,103 B2 | 3/2004 | Wild et al. | |
| 6,860,244 B2 | 3/2005 | Glugla et al. | |
| 6,862,515 B2 | 3/2005 | Vogt | |
| 6,877,311 B2 | 4/2005 | Uchida | |
| 7,198,030 B2 | 4/2007 | Irisawa | |
| 7,290,387 B2 * | 11/2007 | Yoshioka | 60/285 |
| 8,051,835 B2 * | 11/2011 | Soejima et al. | 123/406.45 |
| 8,112,218 B2 * | 2/2012 | Russ | 701/114 |
| 2007/0199551 A1 | 8/2007 | Porten et al. | |
| 2009/0288391 A1 | 11/2009 | Aoki | |

FOREIGN PATENT DOCUMENTS

| | | |
|---|---|---|
| JP | 2000153132 A | 6/2000 |
| JP | 2006177185 A | 7/2006 |
| JP | 2009103055 A | 5/2009 |

* cited by examiner

*Primary Examiner* — Willis R Wolfe, Jr.
(74) *Attorney, Agent, or Firm* — Julia Voutyras; Alleman Hall McCoy Russell & Tuttle LLP

(57) ABSTRACT

A method for reducing a temperature of an engine component is disclosed. In one example, an air-fuel ratio provided to an engine is adjusted to reduce a temperature of an engine component. The approach may be useful for controlling temperature and emissions from a turbocharged engine.

15 Claims, 4 Drawing Sheets

METHOD FOR CONTROLLING AN ENGINE

CROSS REFERENCE TO RELATED APPLICATIONS

The present application is a continuation of U.S. patent application Ser. No. 13/044,807 filed Mar. 10, 2011, now U.S. Pat. No. 8,112,218, the entire contents of which are incorporated herein by reference for all purposes.

BACKGROUND/SUMMARY

Engines may be operated at higher speeds and loads in response to an operator torque request. As engine speed and load increase, the exhaust gas temperature and exhaust mass flow rate can increase. If the engine is operated at a higher speed and load for an extended period of time, one or more engine components may experience at least some degradation. For example, if an engine is operated at a higher speed and load for an extended period of time, a temperature of a component such as a turbine or a catalyst may be elevated so that the component experiences at least some degradation.

The inventor herein has recognized the above-mentioned limitations of operating an engine at higher speeds and loads and has developed a method for operating an engine at higher speeds and loads such that the possibility of component degradation and engine emissions may be reduced. In one example, the method comprises operating an engine at a lean air-fuel ratio that reduces exhaust gas temperatures for a first portion of an operating period, and operating the engine at a rich air-fuel ratio that reduces exhaust gas temperatures for a second portion of an operating period when a temperature of an engine component is greater than a degradation threshold temperature of the engine component.

By operating the engine at both lean and rich air-fuel ratios that reduce exhaust gas temperatures, it may be possible to control and lower temperatures of engine components that are exposed to exhaust gases. In addition, by operating the engine rich and lean, it may be possible to allow a catalyst to operate at conditions where catalyst efficiency is high. For example, rather than operating with a solely rich air-fuel mixture during higher engine speeds and loads where catalyst hydrocarbon conversion efficiency may degrade over time, the excess oxygen present during lean operating conditions can be stored in a three-way catalyst to convert hydrocarbons to $H_2O$ and $CO_2$ during conditions where the engine is operated rich. In this way, it may be possible to control and reduce temperatures of engine components while the catalyst operates at high efficiency.

The present description may provide several advantages. For example, the approach may improve engine emissions by continuing to convert hydrocarbons and NOx while the engine operates at higher engine speeds and loads. Specifically, excess oxygen in exhaust gases during lean operating conditions may be stored within a three-way catalyst and used at a later time to convert hydrocarbons to $CO_2$ and $H_2O$. Further, the approach can control and reduce temperatures of engine components that are exposed to engine exhaust gases by reducing exhaust gas temperatures that may be produced by the engine while the engine is operating at similar speeds and loads combusting substantially stiochiometric air-fuel ratios.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
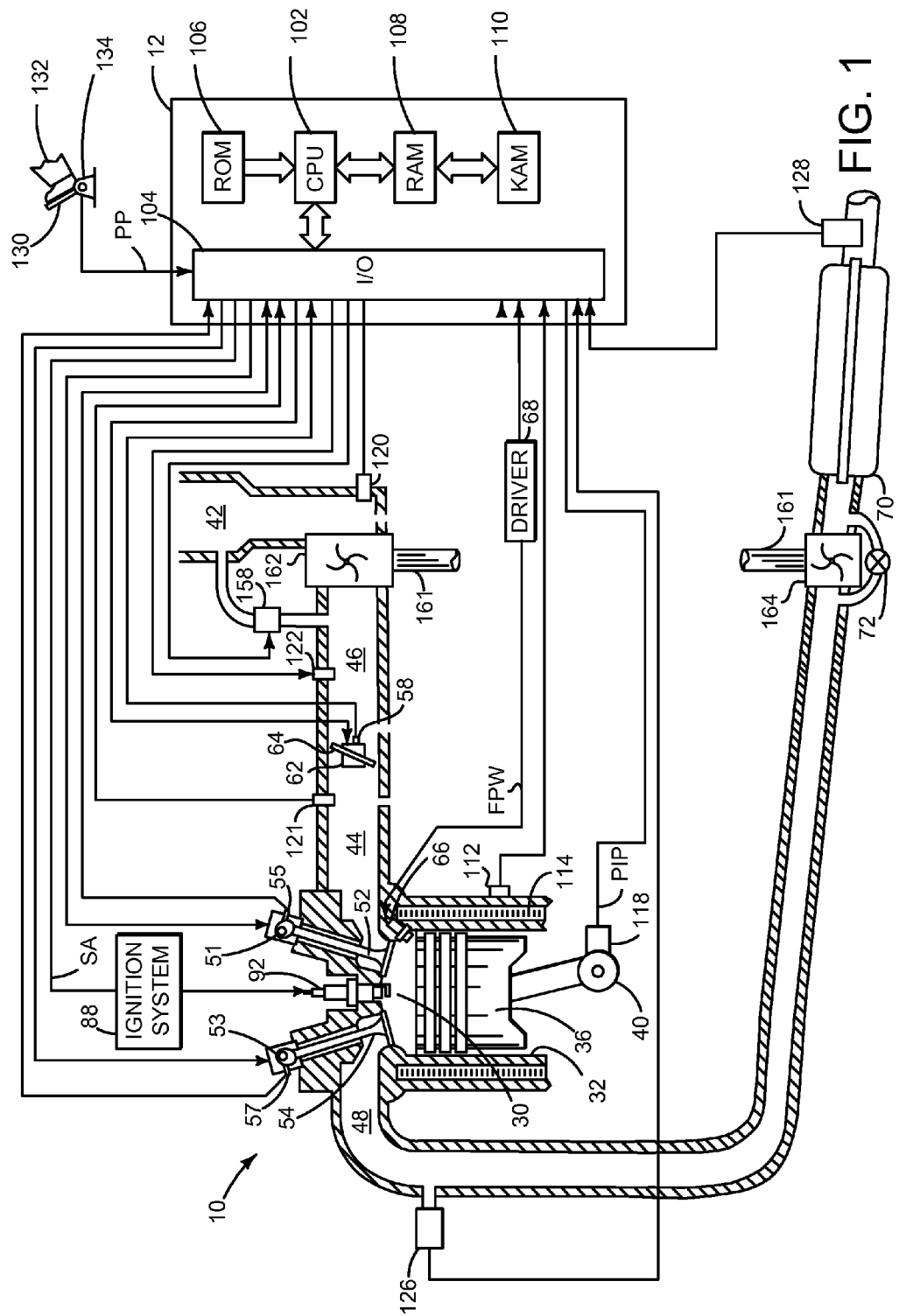
FIG. 1 shows a schematic depiction of an engine.
Figure 2:
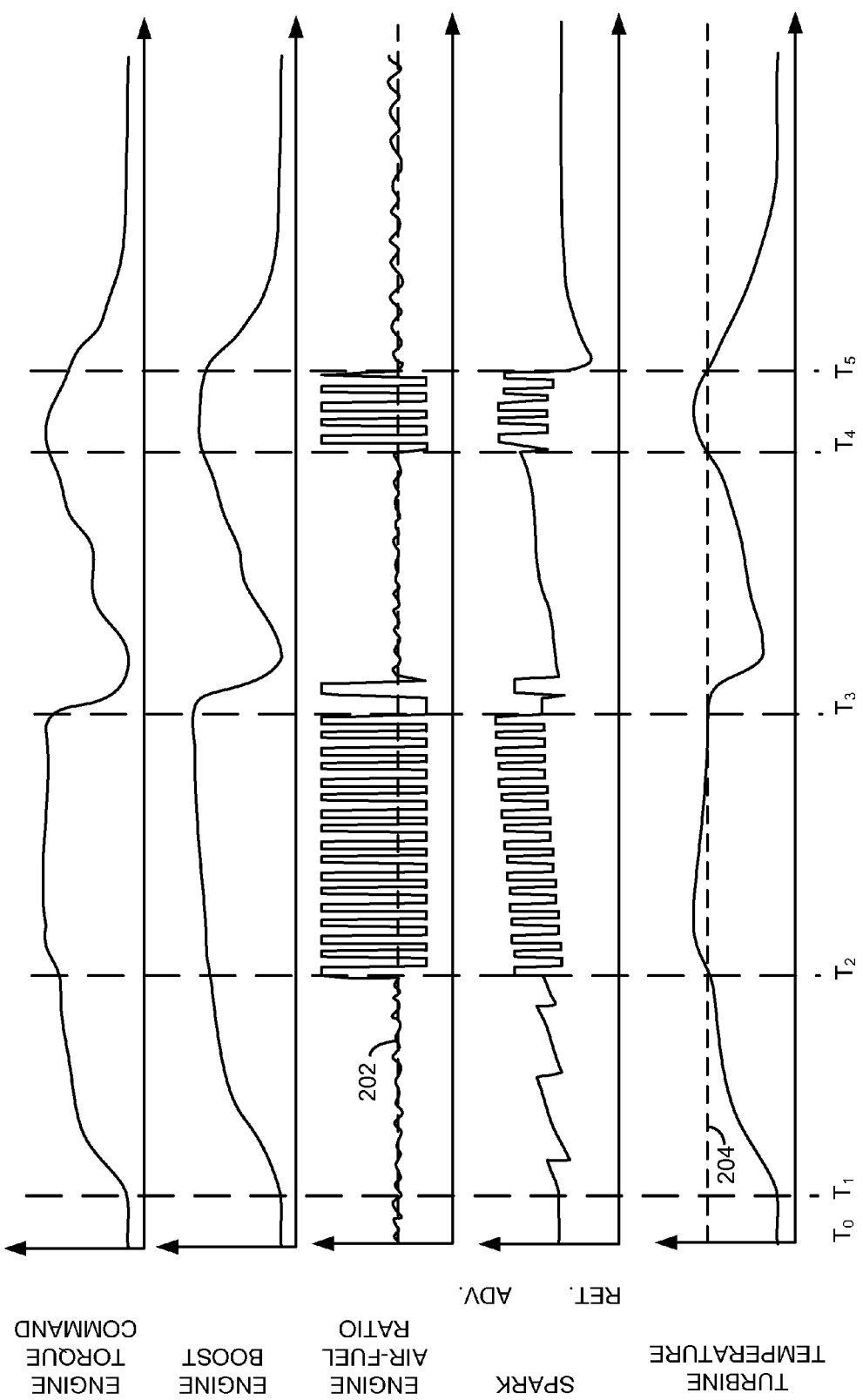
FIGS. 2-3 show simulated signals of interest during engine operation.
Figure 3:
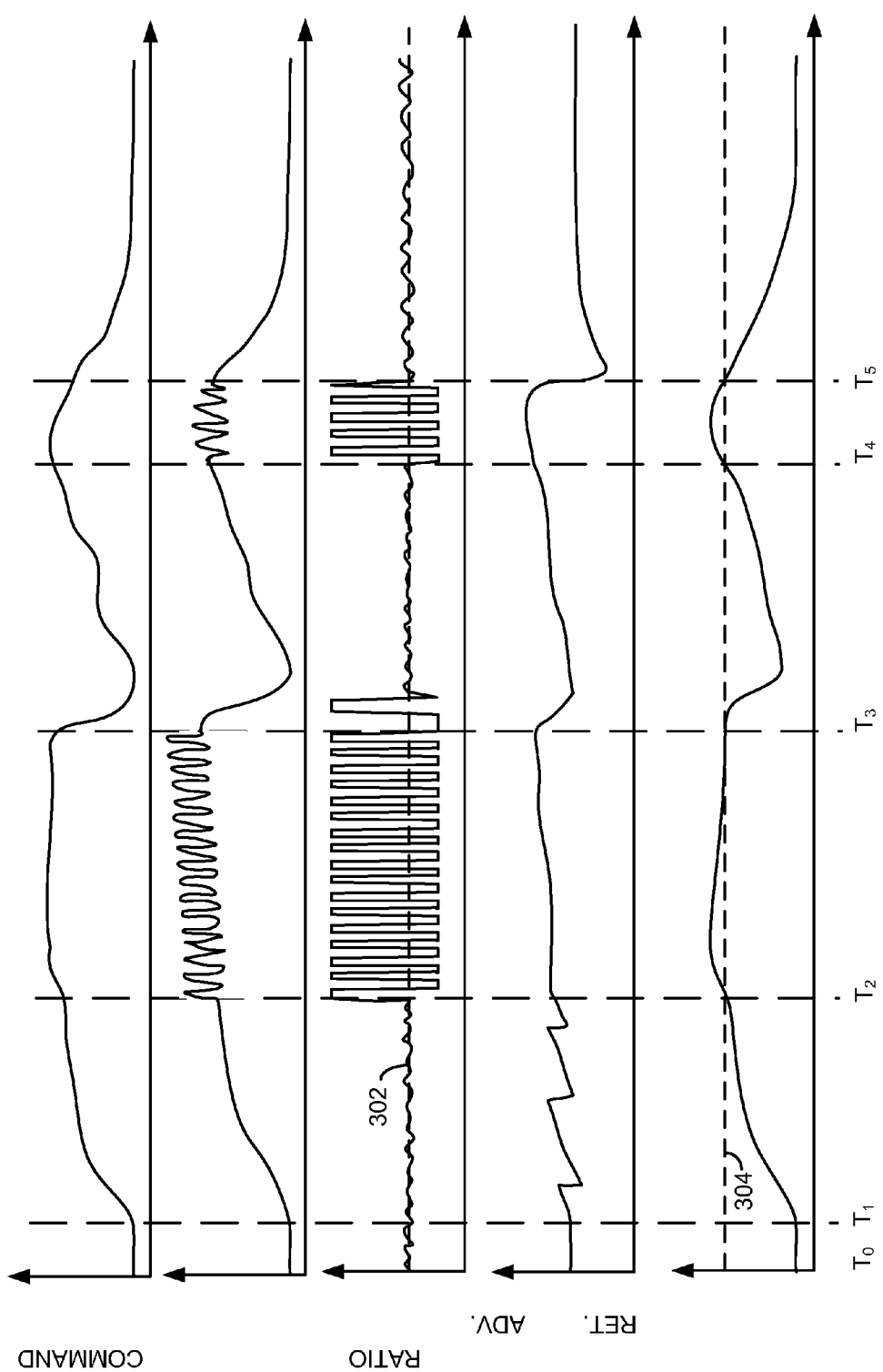
Figure 4:
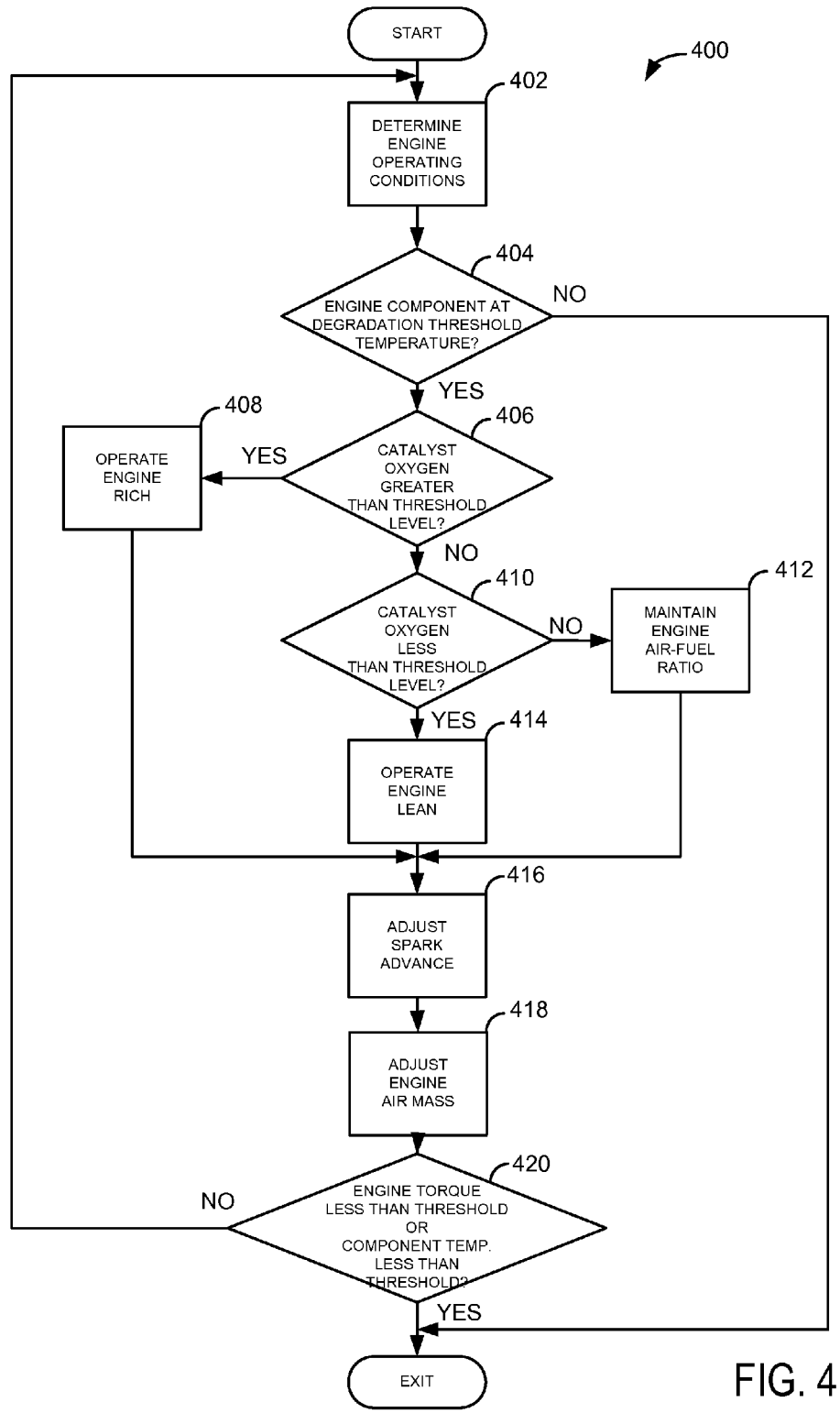
FIG. 4 shows a high level flowchart of a method for operating an engine.

The present description is related to operating an engine during higher engine speeds and loads. FIG. 1 shows an example engine system where the present description may be implemented. FIGS. 2 and 3 show simulated signals of interest when operating an engine according to the present description. FIG. 4 shows a method for providing operating an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Compressor 162 draws air from air intake 42 to supply boost chamber 46. Exhaust gases spin turbine 164 which is coupled to compressor 162 via shaft 161. Vacuum operated waste gate actuator 72 allows exhaust gases to bypass turbine 164 so that boost pressure can be controlled under varying operating conditions. Vacuum is supplied to waste gate actuator 72 via a vacuum reservoir (not shown).

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example. Oxygen sensor 128 provides an indication of exhaust gas oxygen concentration downstream of converter 70.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, simulated signals of interest during an engine operating sequence is shown. The first plot from the top of FIG. 2 shows an engine torque command. The Y axis represents engine torque amount, and the engine torque amount increases in the direction of the Y axis arrow. The X axis represents time, and time increases from the left to the right.

The second plot from the top of FIG. 2 shows engine boost during the engine operating sequence. The Y axis represents engine boost, and engine boost increases in the direction of the Y axis arrow. The X axis represents time, and time increases from the left to the right. In one example, engine boost is provided by a turbocharger compressing air entering the engine. In another example, engine boost is provided by a supercharger compressing air entering the engine.

The third plot from the top of FIG. 2 shows engine air-fuel ratio during the engine operating sequence. The Y axis represents engine air-fuel ratio, and engine air-fuel ratio becomes leaner in the direction of the Y axis arrow. The X axis represents time, and time increases from the left to the right. Horizontal line 202 represents a stoichiometric air-fuel mixture. Consequently, air-fuel mixtures above line 202 are lean while air-fuel mixtures below line 202 are rich.

The fourth plot from the top of FIG. 2 shows engine spark advance during the engine operating sequence. The Y axis represents engine spark advance, and engine spark becomes more advanced in the direction of the Y axis arrow. Spark becomes more retarded toward the X axis. The X axis represents time, and time increases from the left to the right.

The fifth plot from the top of FIG. 2 shows engine turbine temperature during the engine operating sequence. The turbine temperature may be related to engine exhaust gas temperatures as the turbine may be exposed to engine exhaust gases. The Y axis represents turbine temperature, and turbine temperature increases in the direction of the Y axis arrow. The X axis represents time, and time increases from the left to the right. Horizontal line 204 represents a turbine degradation threshold temperature (e.g., a temperature where it may be desirable to take actions to limit turbine temperature).

At time $T_0$, the engine torque command is at a low level as is engine boost and turbine temperature. The engine air-fuel ratio is operating in a narrow band around a stoichiometric air-fuel mixture, and the spark is at a substantially constant level.

At time $T_1$, the engine torque command begins to increase. The engine torque command may be input from a vehicle operator or a vehicle controller. The engine boost also begins to increase as the turbine speed begins to increase. As the turbine speed increases, air pressure in the intake system downstream of the compressor increases. The engine continues to operate with a substantially stoichiometric air-fuel mixture. The spark advances and retards according to engine operating conditions (e.g., engine speed and load) such as during vehicle acceleration and vehicle transmission shifting. The turbine temperature begins to increase as the engine operates at higher torque outputs for a longer period of time.

At time $T_2$, the engine torque has reached a higher level as does the engine boost. In addition, the turbine temperature has increased to a level where the turbine threshold temperature is exceeded. Consequently, the air-fuel ratio supplied to the engine is adjusted so as to reduce engine exhaust gas temperature. In particular, the engine is initially transitioned to a lean air fuel mixture where the engine torque is substantially maintained and where the engine exhaust gas temperature is reduced. The lean mixture is a mixture that reduces exhaust gas temperatures as compared to when the engine is operating at similar conditions combusting a substantially stoichiometric mixture. The engine torque may be maintained by increasing the engine air amount, maintaining the engine fuel amount, and advancing spark timing. The engine air amount may be increased by opening the intake throttle.

The engine air-fuel is transitioned to a rich mixture when the amount of oxygen stored in a three-way catalyst located in the vehicle exhaust system downstream of a turbocharger turbine reaches a threshold level (e.g., 80% of the oxygen storage capacity of the catalyst). The rich air-fuel mixture is a mixture that reduces exhaust gas temperatures as compared to when the engine is operating at similar conditions combusting a substantially stoichiometric mixture. Further, the engine torque is substantially maintained when the engine is operated with the rich air-fuel mixture. The engine torque may be maintained by retarding the spark as the engine is transitioned from operating with a lean air-fuel mixture to operating with a rich air-fuel mixture when the engine fuel amount is increased. If the engine fuel amount is maintained and the engine air amount is decreased, spark may not be retarded.

The oxygen storage capacity of the catalyst in the engine exhaust system may be modeled as described in U.S. Pat. No. 6,751,947 which is hereby incorporated in its entirety by reference for all intents and purposes. In other examples, the engine may be transitioned from a lean mixture to a rich mixture when the output of an oxygen sensor located downstream of the three-way catalyst indicates more than a threshold level of oxygen present in exhaust gases downstream of the three-way catalyst. Likewise, when the amount of oxygen stored in the catalyst is depleted to a threshold amount (e.g., 20% of the oxygen storage capacity of the catalyst) the air-fuel ratio supplied to the engine can be adjusted to a lean mixture.

In some examples, the engine may operate farther away from stiochmetric operating conditions when operating lean as compared to when the engine is operated rich. For example, the engine may be operated at 12:1 during rich conditions while the engine may be operated at 20:1 during lean operating conditions. In one example, the amount of fuel injected during lean operating conditions may be the substantially the same amount as when the engine is operated with a rich air-fuel mixture. The difference in engine air-fuel ratio may be achieved via increasing or decreasing the engine air amount.

The engine air-fuel ratio and engine spark are adjusted between times $T_2$ and $T_3$ to cool engine exhaust gases while at the same time providing the desire engine torque amount. It can be observed that varying the engine air-fuel ratio from lean to rich states where exhaust gas temperatures may be lower as compared to similar operating conditions where the engine is operated with a substantially stoichiometric mixture cools the turbine temperature between times $T_2$ and $T_3$.

At time $T_3$, the engine torque demand is reduced and the turbine temperature is reduced to a level less than the turbine degradation threshold temperature 204. The engine boost level is also reduced but lags behind the engine torque request. The engine air-fuel ratio continues to oscillate between lean and rich mixtures where exhaust gas temperatures are lowered, and the spark advance is adjusted such that the engine torque is substantially maintained during the transition from the rich to lean mixture and from the lean to rich mixture. A short time after $T_3$, the engine air-fuel ratio amplitude is reduced and it oscillates around a stoichiometric air-fuel mixture. The turbine temperature continues to decreases after time $T_3$ as engine speed and load are reduced.

At about a quarter of the way between time $T_2$ and $T_3$ the engine torque command and boost amount are increased in response to an operator or controller request. The engine continues to operate with an air-fuel mixture that is near a stoichiometric mixture. For example, if a stoichiometric mixture is 14.6:1, the engine operates between 14.3:1 and 14.9:1.

At time $T_4$, the turbine temperature has increased to a level where the turbine degradation threshold temperature 204 is exceeded. Accordingly, the engine air-fuel ratio and the engine spark are adjusted so as to reduce engine exhaust gas temperature while substantially maintaining engine torque at the desired engine torque. In particular, the engine air-fuel ratio is cycled between rich and lean air-fuel ratios where engine exhaust gas temperature is reduced as compared to if the engine were operating at substantially similar operating conditions with a stoichiometric air-fuel mixture. The engine air-fuel ratio and spark are oscillated and varied until time $T_5$ where the turbine temperature is reduced to a level less than the turbine degradation threshold temperature 204.

At time $T_5$, the engine air fuel ratio amplitude is decreased and the engine air-fuel ratio varies around substantially stoichiometric conditions. The turbine temperature decreases after time $T_5$ as the engine torque and engine boost remain low.

Referring now to FIG. 3, simulated signals of interest during an engine operating sequence is shown. The engine operating sequence of FIG. 3 is the same operating sequence of FIG. 2; however, engine boost and/or engine throttle are adjusted with engine air-fuel ratio instead of spark. In other examples, engine boost and spark may be adjusted with engine air-fuel ratio to control and reduce exhaust gas temperatures. Since the sequences of FIGS. 2 and 3 are similar, only the portions of sequence in FIG. 3 that are different from the sequence of FIG. 2 will be described for the sake of brevity.

Between time $T_2$ and $T_3$, the engine boost is varied so that the engine air amount may be varied to compensate for the change in engine air-fuel ratio. Engine boost may be adjusted via changing a position of a wastegate or turbine vane positions. For example, boost is increased when the engine operates lean and is decreased when the engine operates rich. In other examples, the throttle may be adjusted with engine boost so as to increase the cylinder air amount when the engine is operated at the lean air-fuel ratio. By adjusting the engine air amount, the engine torque may be substantially maintained when transitioning between lean and rich air-fuel mixtures.

Referring now to FIG. 4, a flowchart of a method for operating an engine is shown. At 402, engine operating conditions are determined. Engine operating conditions may include but are not limited to engine temperature, engine speed, engine load, engine component temperatures, engine air-fuel ratio, and catalyst oxygen storage amount. Method 400 proceeds to 404 after engine operating conditions are determined.

At 404, method 400 judges whether or not an engine component is at a component degradation threshold temperature. The engine component temperature may be directly measured via a temperature sensor or estimated via engine operating parameters. For example, a temperature of a turbocharger turbine may be estimated based on engine air mass, engine spark timing, and engine speed. In one example, a table holding empirically determined turbine temperatures may be indexed using engine air mass, engine spark timing, and engine speed. The engine component from which the temperature is estimated may vary from application to application. For example, in one application, the turbine temperature of a turbocharger may be estimated or measured. In another example, the temperature of a catalyst located in an exhaust system may be estimated or measured. If a temperature of the component is at or greater than a component threshold degradation temperature, method 400 proceeds to 406. Otherwise, method 400 proceeds to exit.

At 406, method 400 judges whether or not an amount of oxygen stored in a catalyst in an engine exhaust system is greater than a threshold level. In one example, the threshold level is 80% of the oxygen storage capacity of the catalyst. Further, the amount of oxygen stored in the catalyst is estimated according to the method described in U.S. Pat. No. 6,751,947. If the amount of oxygen stored in a catalyst is greater than a threshold level, method 400 proceeds to 408. Otherwise, method 400 proceeds to 410.

In an alternative example, method 400 may move to 408 when an output of an oxygen sensor indicates that exhaust gases in the exhaust system have more oxygen than a threshold level. Thus, method 400 may switch the engine air-fuel ratio to a rich mixture in response to output of an oxygen sensor.

At 408, method 400 shifts the engine to operating with a rich air-fuel ratio. The rich air-fuel ratio is an air-fuel ratio that cools engine exhaust gases as compared to if the engine were operating at substantially the same operating conditions with a substantially stiochiometric air-fuel mixture. In one example, where the engine is operated using gasoline, the engine is operated at an air-fuel ratio richer than 12:1. However, when other fuels such as gasoline/alcohol mixtures are supplied to the engine, different rich air-fuel ratios may be utilized. In some examples, the engine air-fuel ratio may be richened by maintain the amount of fuel injected and deceasing the engine air amount at 418. In other examples, the engine air amount may be based on engine speed and load, but the fuel amount may be increased to richen the air-fuel mixture. Method 400 proceeds to 416 after the engine air-fuel ratio is richened.

At 410, method 400 judges whether or not an amount of oxygen stored in a catalyst located in an engine exhaust system is less than a threshold amount. Again, the amount of oxygen stored in the catalyst may be estimated according to the method described in U.S. Pat. No. 6,751,947. If the amount of oxygen stored in the catalyst is less than a threshold amount, method 400 proceeds to 414. Otherwise, method 400 proceeds to 412.

In an alternative example, method 400 may move to 414 when an output of an oxygen sensor indicates that exhaust gases in the exhaust system have less oxygen than a threshold level. Thus, method 400 may switch the engine air-fuel ratio to a lean mixture in response to output of an oxygen sensor.

At 412, method 400 maintains engine operation at the present air-fuel ratio. For example, if the engine is operating at a rich air-fuel mixture the engine continues to operate at a rich air-fuel mixture. Thus, the catalyst continues to store or use oxygen within the catalyst such that the catalyst chemistry stays within a range where catalyst efficiency is high. Method 400 proceeds to 416 after maintaining the engine air-fuel ratio.

At 414, method 400 operates the engine with a lean air-fuel mixture. The lean air-fuel ratio is an air-fuel ratio that cools engine exhaust gases as compared to if the engine were operating at substantially the same operating conditions with a substantially stiochiometric air-fuel mixture. In one example, where the engine is operated using gasoline, the engine is operated at an air-fuel ratio leaner than 18:1. However, when other fuels such as gasoline/alcohol mixtures are supplied to the engine, different rich air-fuel ratios may be utilized. In some examples, the engine air-fuel ratio may be made lean by maintain the amount of fuel injected and increasing the engine air amount at 418. In other examples, the engine air amount may be based on engine speed and load, but the fuel amount may be decreased to lean the air-fuel mixture. Method 400 proceeds to 416 after the engine air-fuel ratio is adjusted lean.

At 416, method 400 adjusts engine spark timing. In one example, spark timing is retarded when the engine air-fuel mixture is richened so as to substantially maintain the engine torque. Further, the spark timing may be advanced when the engine is operated lean. Method 400 proceeds to 418 after adjusting engine spark.

At 418, the engine air mass may be adjusted. In some examples where the engine fuel amount is based on an amount of an engine torque request, the engine air-fuel ratio may be richened by decreasing the engine air amount by lowering engine boost and/or decreasing the intake throttle opening amount. Alternatively, the engine air-fuel ratio may be made leaner by increasing the engine air amount by increasing engine boost and/or increasing the intake throttle opening amount. Method 400 proceeds to 420 after adjusting the engine air amount.

At 420, method 400 judges whether or not engine torque is less than a threshold level or if a temperature of the engine component is less than the degradation threshold temperature. If so, method 400 proceeds to exit. Otherwise, method 400 returns to 402.

In this way, method 400 adjusts engine operation to decrease engine exhaust gas temperatures while maintaining engine torque. Further, method 400 holds the oxygen concentration within a catalyst in the engine's exhaust system within a range where catalyst efficiency is high. Consequently, component temperatures of the engine can be controlled and lowered while converting exhaust gases to $CO_2$ and $H_2O$ efficiently.

Thus, the method of FIG. 4 provides for an engine operating method, comprising: operating an engine at a lean air-fuel ratio that reduces exhaust gas temperatures for a first portion of an operating period, and operating the engine at a rich air-fuel ratio that reduces exhaust gas temperatures for a second portion of an operating period when a temperature of an engine component is greater than a degradation threshold temperature of the engine component. In this way, it may be possible to reduce exhaust gas temperatures at higher engine speeds and loads while converting exhaust gases to $H_2O$ and $CO_2$. The engine operating includes where the engine component is a turbine of a turbocharger. The engine operating further comprises operating the engine at a substantially stoichiometric air-fuel ratio on average during the operating period. In one example, the engine operating method includes where the engine is a turbocharged engine having a three-way catalyst located downstream of a turbine of the turbocharger. Thus, the method can reduce the possibility of degrading components of the turbocharger. The engine operating method further comprises operating the engine at a first spark timing when the engine is operating at the lean air-fuel ratio, and operating the engine at a second spark timing when the engine is operating at the rich air-fuel ratio, where the first spark timing is different from the second spark timing. The engine operating method further comprises operating the engine with a first boost amount when the engine is operating at the lean air-fuel ratio, and operating the engine at a second boost amount when the engine is operating at the rich air-fuel ratio, the first boost amount higher than the second boost amount.

In another example, the method of FIG. 4 provides for an engine operating method, comprising: operating an engine at a lean air-fuel ratio that reduces exhaust gas temperatures when oxygen stored in a catalyst is less than a first amount and when an engine component temperature is greater than a degradation threshold temperature; and operating the engine at a rich air-fuel ratio that reduces exhaust gas temperature when oxygen stored in the catalyst is greater than a second amount and when an engine component temperature is greater than the degradation threshold temperature. The engine operating method includes where the engine is operated at the lean air-fuel ratio before being operated at the rich air-fuel ratio after the engine component temperature is greater than the degradation threshold temperature. The engine operating also includes where the engine is operated at the rich air-fuel ratio before being operated at the lean air-fuel ratio after the engine component temperature is greater than the degradation threshold temperature. The engine operating method further includes where the first amount is an amount less than an oxygen storage capacity of the catalyst. The engine operating includes where the second amount is less than the first amount. The engine operating method further comprises adjusting spark timing of the engine when transitioning from operating the engine at the lean air-fuel ratio to operating the engine at the rich air-fuel ratio. In this way, engine torque may be controlled to smooth engine operation. The engine operating method further comprises operating the engine at a higher air mass flow rate during operating with the lean air-fuel ratio. The engine operating method includes where the higher air mass flow rate is achieved at least in part by increasing engine boost pressure. In this way, the engine air amount can be increased while the fuel injected to the engine is maintained so as to lean the air-fuel mixture without reducing engine torque.

The method of FIG. 4 further provides for an engine operating method, comprising: operating an engine at a lean air-fuel ratio that reduces exhaust gas temperatures when oxygen stored in a catalyst is less than a first amount and when an engine component temperature is greater than a degradation threshold temperature; operating the engine at a rich air-fuel ratio that reduces exhaust gas temperature when oxygen stored in the catalyst is greater than a second amount and when an engine component temperature is greater than the degradation threshold temperature; and providing substantially a same amount of torque from the engine at the lean air-fuel ratio as at the rich air-fuel ratio. The engine operating method further comprises estimating an amount of oxygen stored in the catalyst via at least one oxygen sensor, and transitioning from the lean air-fuel ratio to the rich air-fuel ratio in response to the estimated amount of oxygen stored in the catalyst. The engine operating method further comprises adjusting an amount of boost in response to transitioning operating the engine at the lean air-fuel ratio and the rich air-fuel ratio. The engine operating method further comprises adjusting spark timing of the engine when transitioning from operating the engine at the lean air-fuel ratio to operating the engine at the rich air-fuel ratio. The engine operating method further comprises transitioning between operating the engine with the lean air-fuel ratio and the rich air-fuel ratio in response to an oxygen sensor positioned downstream of a catalyst relative to the direction of exhaust flow. In this way, the control system can adjust the engine air-fuel ratio responsive to operating conditions of the catalyst to thereby promote higher catalyst conversion efficiency. The engine operating method further comprises reducing amplitude of an engine air-fuel ratio in response to at least a decreasing engine torque demand.

As will be appreciated by one of ordinary skill in the art, the method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine method, comprising:
operating an engine at a lean air-fuel ratio that reduces exhaust gas temperatures for a first portion of an operating period, and operating the engine at a rich air-fuel ratio that reduces exhaust gas temperatures for a second portion of the operating period when an engine component temperature is greater than the component's degradation threshold temperature; and
operating the engine with a first boost amount when the engine is operating at the lean air-fuel ratio, and operating the engine at a second boost amount when the engine is operating at the rich air-fuel ratio, the first boost amount higher than the second boost amount.

2. The engine method of claim 1, where the engine component is a turbine of a turbocharger.

3. The engine method of claim 1, further comprising operating the engine at a substantially stochiometric air-fuel ratio on average during the operating period.

4. The engine method of claim 1, where the engine is a turbocharged engine having a three-way catalyst located downstream of a turbine of a turbocharger.

5. The engine method of claim 1, further comprising operating the engine at a first spark timing when the engine is operating at the lean air-fuel ratio, and operating the engine at a second spark timing when the engine is operating at the rich air-fuel ratio, where the first spark timing is different from the second spark timing.

6. An engine operating method, comprising:
operating an engine at a lean air-fuel ratio that reduces exhaust gas temperatures when oxygen stored in a catalyst is less than a first amount and when an engine component temperature is greater than a degradation threshold temperature;
operating the engine at a rich air-fuel ratio that reduces exhaust gas temperature when oxygen stored in the catalyst is greater than a second amount and when an engine component temperature is greater than the degradation threshold temperature; and
operating the engine at a higher air mass flow rate during operation with the lean air-fuel ratio.

7. The engine operating method of claim 6, where the engine is operated at the lean air-fuel ratio before being operated at the rich air-fuel ratio after the engine component temperature is greater than the degradation threshold temperature.

8. The engine operating method of claim 6, where the engine is operated at the rich air-fuel ratio before being operated at the lean air-fuel ratio after the engine component temperature is greater than the degradation threshold temperature.

9. The engine operating method of claim 6, further comprising adjusting spark timing of the engine when transitioning from operating the engine at the lean air-fuel ratio to operating the engine at the rich air-fuel ratio.

10. The engine operating method of claim 6, where the higher air mass flow rate is achieved at least in part by increasing engine boost pressure.

11. The engine operating method of claim 6, where the first amount is an amount less than an oxygen storage capacity of the catalyst.

12. The engine operating method of claim 11, where the second amount is less than the first amount.

13. An engine method, comprising:
when a turbocharger temperature is greater than a degradation temperature, first operating an engine air-fuel ratio lean with a first boost level to reduce temperature for a first portion of a period and then operating the air-fuel ratio rich with a second, different boost level, to reduce temperature for a second portion of the period; and operating the engine at a substantially stochiometric air-fuel ratio on average during the operating period.

14. The engine method of claim 13, where the engine has a three-way catalyst located downstream of a turbine of the turbocharger.

15. The engine method of claim 13, further comprising operating the engine at a first spark timing when the engine is operating at the lean air-fuel ratio, and operating the engine at a second spark timing when the engine is operating at the rich air-fuel ratio, where the first spark timing is different from the second spark timing.

* * * * *